(12) United States Patent
Li (10) Patent No.: US 10,886,753 B2
(45) Date of Patent: Jan. 5, 2021

(54) SYSTEMS AND METHODS FOR MANAGING A BATTERY PACK

(71) Applicant: O2Micro Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 408 days.

(21) Appl. No.: 15/890,178

(22) Filed: Feb. 6, 2018

(65) Prior Publication Data

US 2018/0233928 A1 Aug. 16, 2018

Related U.S. Application Data (60) Provisional application No. 62/458,238, filed on Feb. 13, 2017.

(51) Int. Cl.
  *H02J 7/00* (2006.01)
  *H01M 10/48* (2006.01)
  *H01M 10/44* (2006.01)
  *H01M 10/42* (2006.01)

(52) U.S. Cl.
  CPC ......... *H02J 7/0014* (2013.01); *H01M 10/441* (2013.01); *H01M 10/48* (2013.01); *H01M 10/482* (2013.01); *H02J 7/0016* (2013.01); *H02J 7/0022* (2013.01); *H02J 7/0026* (2013.01); *H02J 7/0031* (2013.01); *H01M 2010/4271* (2013.01); *H02J 2007/0067* (2013.01)

(58) Field of Classification Search
  CPC .................................................... H02J 7/0014
  USPC ................................................... 320/116–122
  See application file for complete search history.

(56) References Cited

U.S. PATENT DOCUMENTS

| | | | |
|---|---|---|---|
| 6,291,972 B1 | 9/2001 | Zhang | |
| 6,380,763 B1* | 4/2002 | Ando | H02J 7/0031 326/68 |
| 9,570,923 B2* | 2/2017 | Nomura | H02J 7/007 |
| 2002/0006814 A1* | 1/2002 | Fukunishi | H02J 7/0031 455/572 |
| 2009/0146610 A1 | 6/2009 | Trigiani | |
| 2012/0133205 A1 | 5/2012 | Adams et al. | |
| 2014/0365792 A1 | 12/2014 | Yun | |

FOREIGN PATENT DOCUMENTS

| | | |
|---|---|---|
| CN | 1270432 A | 10/2000 |
| EP | 0425044 A1 | 5/1991 |
| EP | 1531535 A2 | 5/2005 |
| EP | 2299517 A2 | 3/2011 |
| EP | 2641783 A2 | 9/2013 |
| WO | 0148496 A1 | 7/2001 |
| WO | 2017115091 A1 | 7/2017 |

\* cited by examiner

*Primary Examiner* — Edward Tso
*Assistant Examiner* — Ahmed H Omar (57) ABSTRACT

A battery controller includes a first driving pin, a second driving pin and a third driving pin. The first driving pin is coupled to a charge switch and is operable for turning on the charge switch to enable a battery pack to be charged by a power source. The second driving pin is coupled to a first discharge switch and is operable for turning on the first discharge switch to enable the battery pack to power a first load. The third driving pin is coupled to a second discharge switch and is operable for turning on the second discharge switch to enable the battery pack to power a second load.

20 Claims, 8 Drawing Sheets

SYSTEMS AND METHODS FOR MANAGING A BATTERY PACK

RELATED APPLICATION

The present application claims priority to U.S. Provisional Patent Application No. 62/458,238, filed on Feb. 13, 2017, entitled "Highly-Integrated Battery Management System with Embedded MCU."

BACKGROUND

Figure 1:
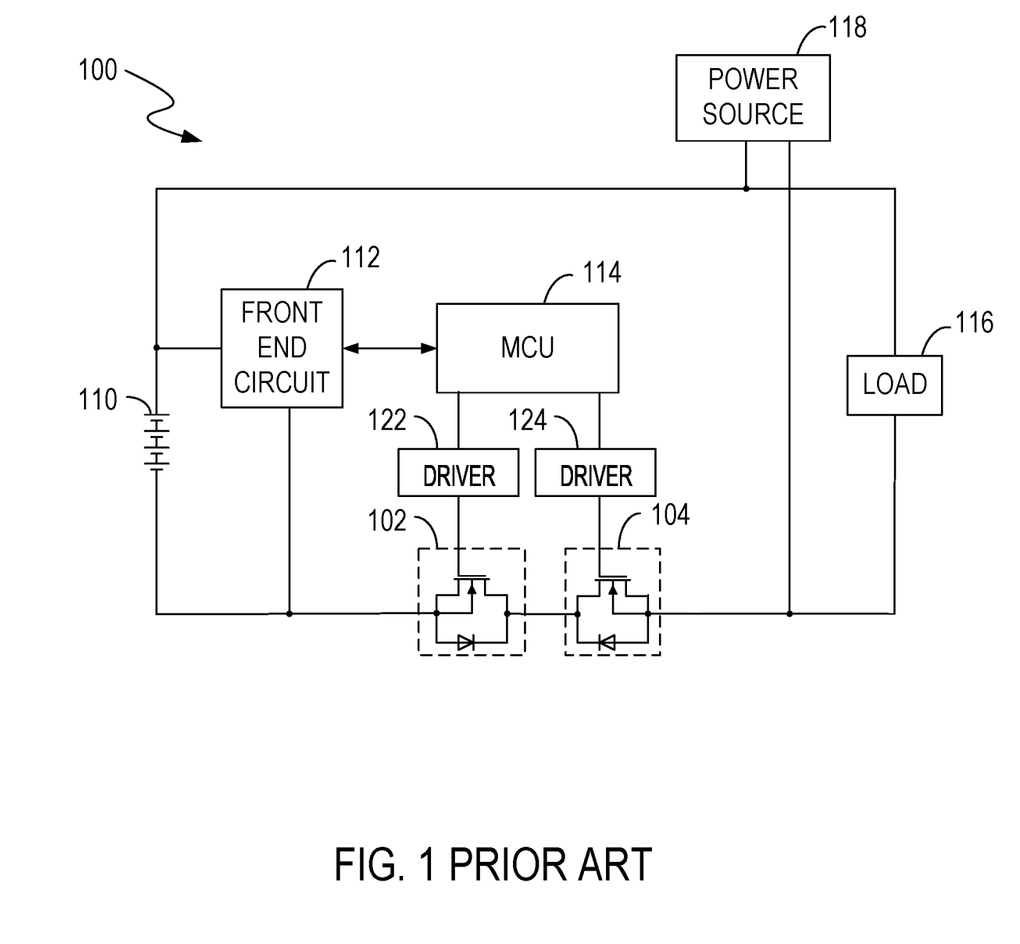
FIG. 1 shows a conventional battery management system.

FIG. 1 illustrates a conventional battery management system 100. The battery management system 100 includes a front end circuit 112, e.g., a digital front end circuit (DFE) or an analog front end (AFE) circuit. The front end circuit 112 monitors individual cell voltages of multiple battery cells 110 in a battery pack, as well as current and temperature of the battery pack. The battery cells 110 can be charged by a power source 118, and can be discharged to power a load 116. The data associated with the battery cells and battery pack is transmitted from the front end circuit 112 to a conventional micro controlling unit (MCU) 114. Based on the data, the MCU 114 monitors safety conditions of the battery pack and health conditions of the battery pack. The safety conditions can include over-voltage, under-voltage, over-temperature, short-current, and over-current conditions. The health conditions can include cell balance state and state-of-charge. The MCU 114 is capable of controlling a discharge switch 102 and a charge switch 104 to control charging and discharging of the battery pack. The discharge switch 102 and the charge switch 104 are typically implemented by metal oxide semiconductor field effect transistors (MOSFET).

The pins of the conventional MCU 114 in FIG. 1 only include low voltage (usually less than 5V) general purpose input/output (GPIO) pins. However, the MOSFET used as the discharge switch 102 and charge switch 104 usually need a higher voltage (e.g., a voltage between 10V and 20V) to drive them on. Therefore, in order to drive the discharge switch 102 and charge switch 104, additional discrete drivers 122 and 124 are added to the system, which increases the cost and size of the circuit as well as power consumption.

SUMMARY

Embodiments in accordance with the present invention provide systems and methods for managing a battery pack.

In an embodiment, a battery controller includes a first driving pin, a second driving pin, and a third driving pin. The first driving pin is coupled to a charge switch and is operable for turning on the charge switch to enable a battery pack to be charged by a power source. The second driving pin is coupled to a first discharge switch and is operable for turning on the first discharge switch to enable the battery pack to power a first load. The third driving pin is coupled to a second discharge switch and is operable for turning on the second discharge switch to enable the battery pack to power a second load.

In another embodiment, a battery management system includes a master controller and a slave controller. The master controller is operable for monitoring and managing a first group of battery cells, where the master controller receives a first current from the first group of battery cells. The slave controller is operable for monitoring and managing a second group of battery cells, where the slave controller receives a second current from the second group of battery cells. The slave controller is operable for generating a signal indicating an amount of the second current and for transmitting the signal to the master controller. The master controller is operable for adjusting the first current and for controlling the slave controller to adjust the second current.

In yet another embodiment, a method for managing a battery pack includes managing a first group of battery cells by a master controller, where the master controller receives a first current from the first group of battery cells; managing a second group of battery cells by a slave controller, where the slave controller receives a second current from the second group of battery cells; and balancing the first current and the second current by the master controller.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
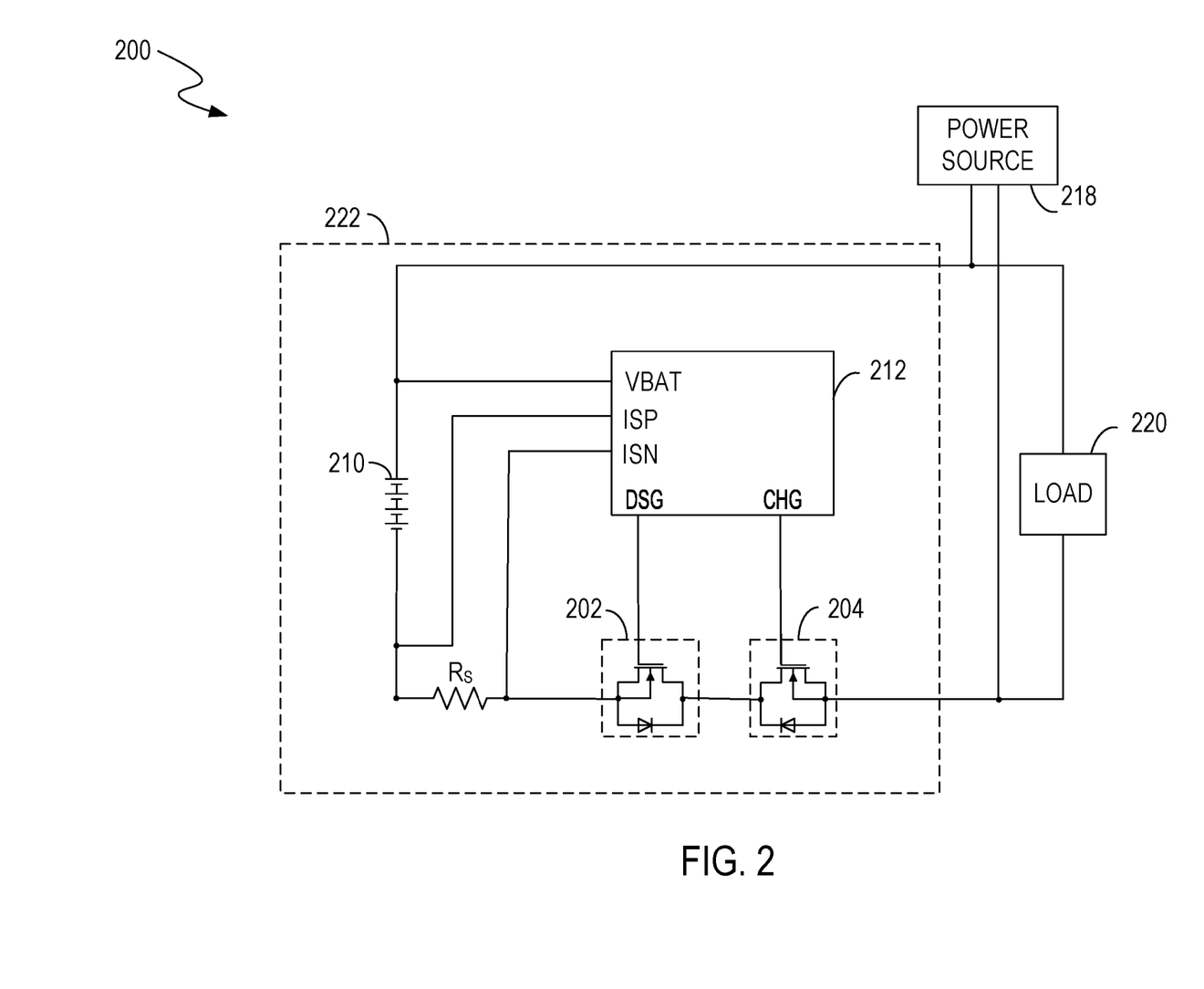
FIG. 2 shows a battery management system, in an embodiment of the present invention.

FIG. 2 shows a battery management system 200, in an embodiment of the present invention. The battery management system 200 includes a battery controller 212 for monitoring and managing multiple battery cells 210. More specifically, the battery controller 212 is operable for monitoring the cell voltage of each battery cell of the battery cells 210, monitoring the total voltage of the battery cells 210, and performing cell balancing and protection. The battery controller 212 and the battery cells 210 can be integrated in a battery pack 222. The battery controller 212 controls a charge switch 204 and a discharge switch 202 to control charging and discharging of the battery cells 210. The charge switch 204 and the discharge switch 202 can be metal oxide semiconductor field effect transistors (MOSFET) that require relatively high voltage driving signals to be turned on. In an embodiment, the pins of the battery controller 212 include VBAT, ISP, ISN, DSG, and CHG.

The voltage sensing pin VBAT senses a total voltage of the multiple battery cells 210. The current sensing pins ISP and ISN sense the charge current and the discharge current by monitoring the voltage difference across a current sensing resistor $R_S$, which is coupled in series with the charge switch 204 and the discharge switch 202. The first driving pin CHG is coupled to the charge switch 204 and is operable for turning on the charge switch 204 to enable the battery pack 222 to be charged by a power source 218. The second driving pin DSG is coupled to the discharge switch 202 and is operable for turning on the discharge switch 202 to enable the battery pack 222 to power a load 220. In an embodiment, the battery controller 212 includes an integrated micro controlling unit (MCU). The second driving pin DSG is implemented by a general-purpose input/output (GPIO) pin of the MCU and is operable for outputting a relatively high voltage (e.g., greater than 5V) driving signal to control the discharge switch 202. The first driving pin CHG and the second driving pin DSG are directly connected to the charge switch 204 and the discharge switch 202, respectively, and therefore the additional discrete drivers 122 and 124 in prior art FIG. 1 can be eliminated.

Figure 3:
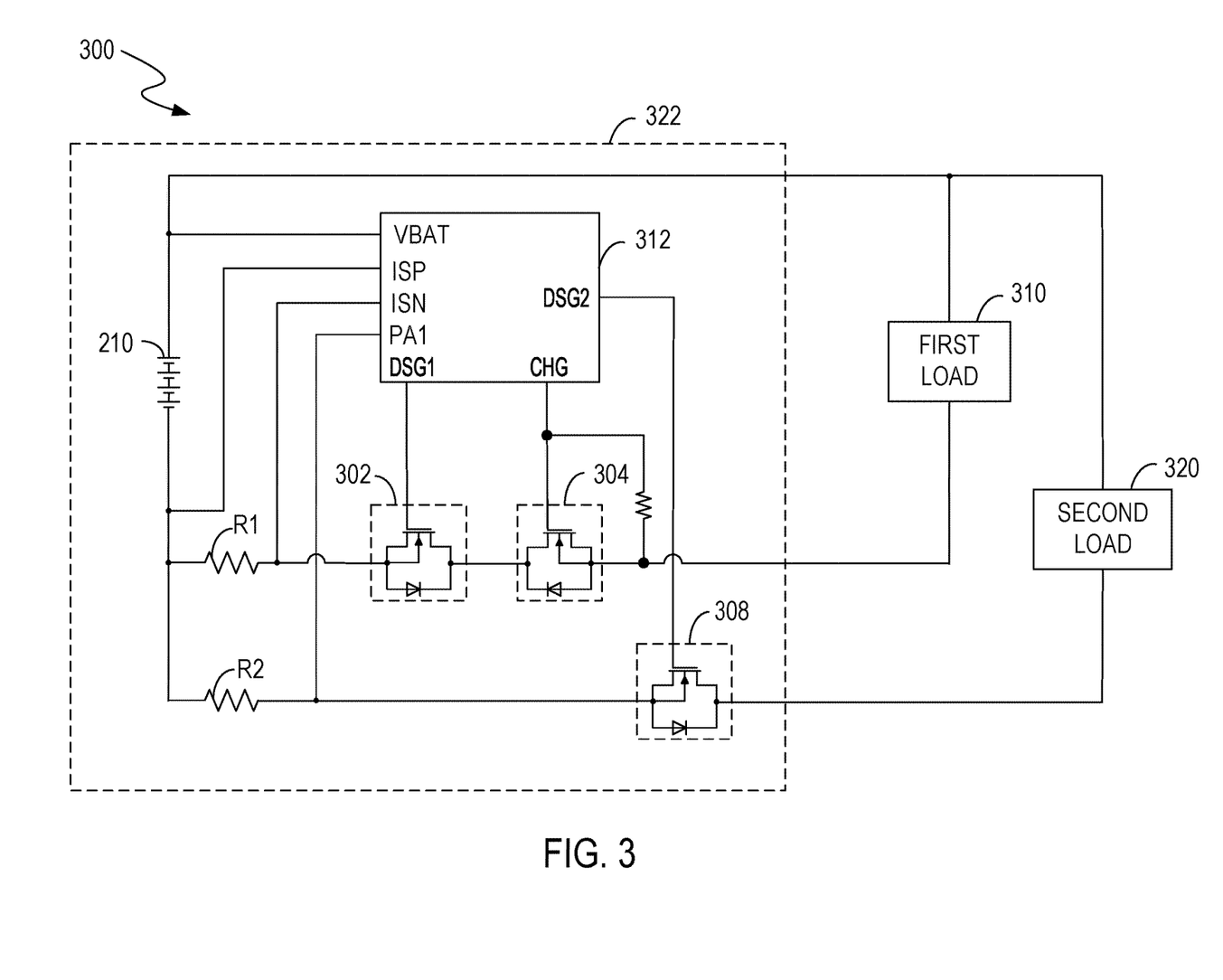
FIG. 3 shows a battery management system, in an embodiment of the present invention.

FIG. 3 shows a battery management system 300, in an embodiment of the present invention. The battery management system 300 includes a battery controller 312 for monitoring and managing multiple battery cells 210. The battery controller 312 and the battery cells 210 can be integrated in a battery pack 322. FIG. 3 does not show the power source that can charge the battery pack 322. In the example of FIG. 3, the battery management 300 includes two discharge loops. A first discharge loop includes a first discharge switch 302 and a second discharge loop includes a second discharge switch 308. The first discharge switch 302 can be coupled to a first load 310, and the second discharge switch can be coupled to a second load 320. In an embodiment, the pins of the battery controller 312 include VBAT, ISP, ISN, PA1, DSG1, DSG2, and CHG.

The voltage sensing pin VBAT senses a total voltage of the multiple battery cells 210. The current sensing pins ISP, ISN, and PA1 are utilized by the battery controller 312 to sense the charge current and the discharge current. More specifically, a first discharge current in the first discharge loop is sensed by monitoring a voltage difference across a current sensing resistor R1, which is coupled in series with the first discharge switch 302. The current sensing resistor R1 has one end coupled to the ISP pin and the other end coupled to the ISN pin. A second discharge current in the second discharge loop is sensed by monitoring a voltage difference across a current sensing resistor R2, which is coupled in series with the second discharge switch 308. Such an arrangement of the resistors R1 and R2 is referred to as parallel mode. The current sensing resistor R2 has one end coupled to the ISP pin and the other end coupled to the PA1 pin. The first driving pin CHG is coupled to the charge switch 304 and is operable for turning on the charge switch 304 to enable the battery pack 322 to be charged by a power source (not shown in FIG. 3). The second driving pin DSG1 is coupled to the first discharge switch 302 and is operable for turning on the first discharge switch 302 to enable the battery pack 322 to power the first load 310 through the first discharge loop. The third driving pin DSG2 is coupled to the second discharge switch 308 and is operable for turning on the second discharge switch 308 to enable the battery pack 322 to power the second load 320 through the second discharge loop.

In an embodiment, the battery controller 312 includes an integrated MCU. The second driving pin DSG1 and the third driving pin DSG2 are implemented by GPIO pins of the MCU and are operable for outputting a relatively high voltage (e.g., greater than 5V) driving signal to directly control the first discharge switch 302 and the second discharge switch 308. The second driving pin DSG1 and the third driving pin DSG2 are directly connected to the first discharge switch 302 and the second discharge switch 308, and therefore additional discrete drivers for driving these switches can be eliminated. In an embodiment, the current sensing pin PA1 is also implemented by a GPIO pin of the MCU.

Figure 4:
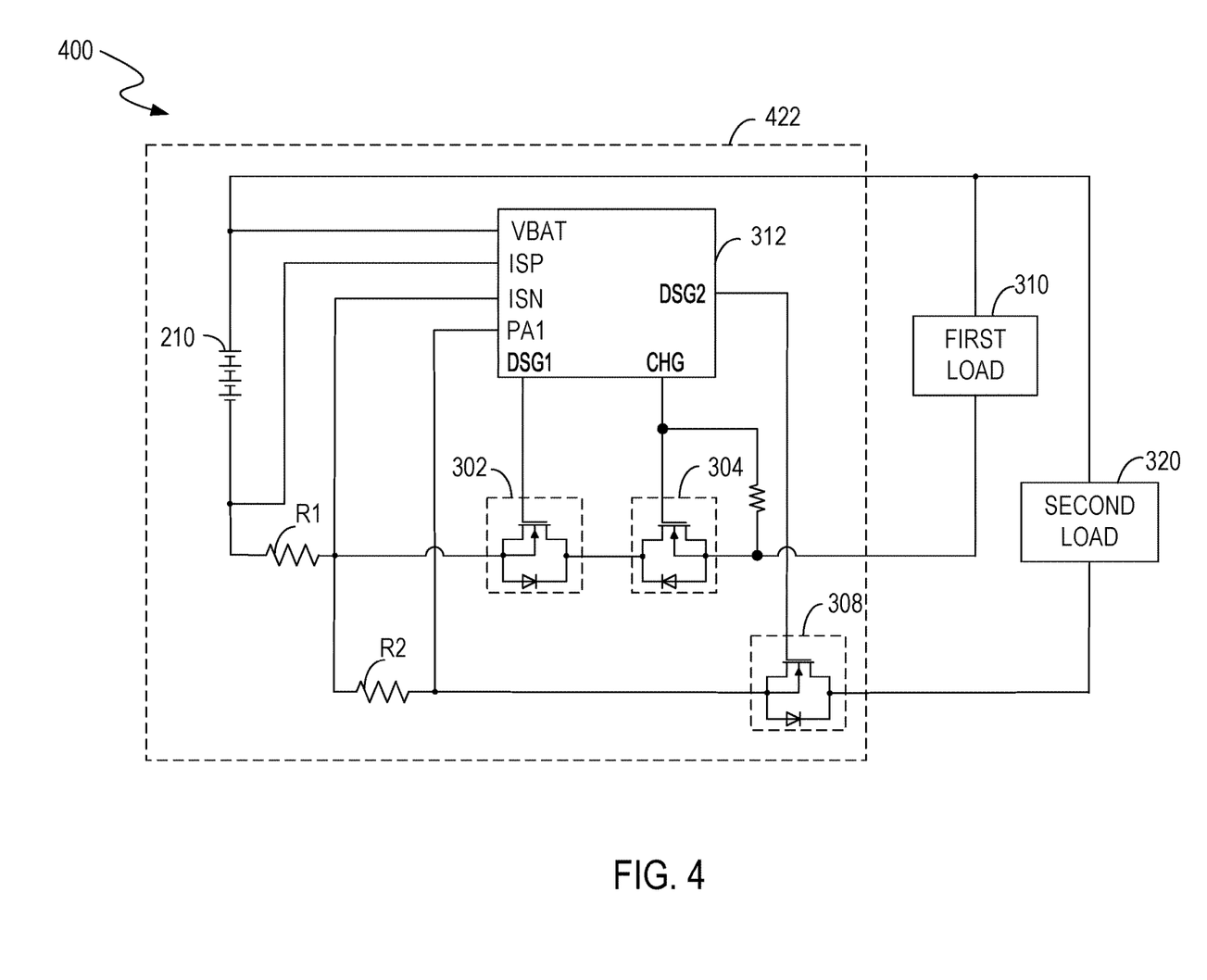
FIG. 4 shows a battery management system, in an embodiment of the present invention.

FIG. 4 shows a battery management system 400, in an embodiment of the present invention. The battery management system 400 is similar to the battery management system 300 in FIG. 3 except for the configuration of the current sensing resistors R1 and R2 in the battery pack 422. In the example of FIG. 4, the resistor R1 has one end coupled to the ISP pin and the other end coupled to the ISN pin. The resistor R2 has one end coupled to the ISN pin and the other coupled to the PA1 pin. Such an arrangement of the resistors R1 and R2 is referred to as series mode. As shown in FIG. 4, the resistor R1 is coupled to the first discharge loop (which includes the first discharge switch 304) and the second discharge loop (which includes the second discharge switch 308) for sensing a first discharge current in the first discharge loop and a second discharge current in the second discharge loop, where both of the first discharge current and the second discharge current flow through the resistor R1.

Figure 5:
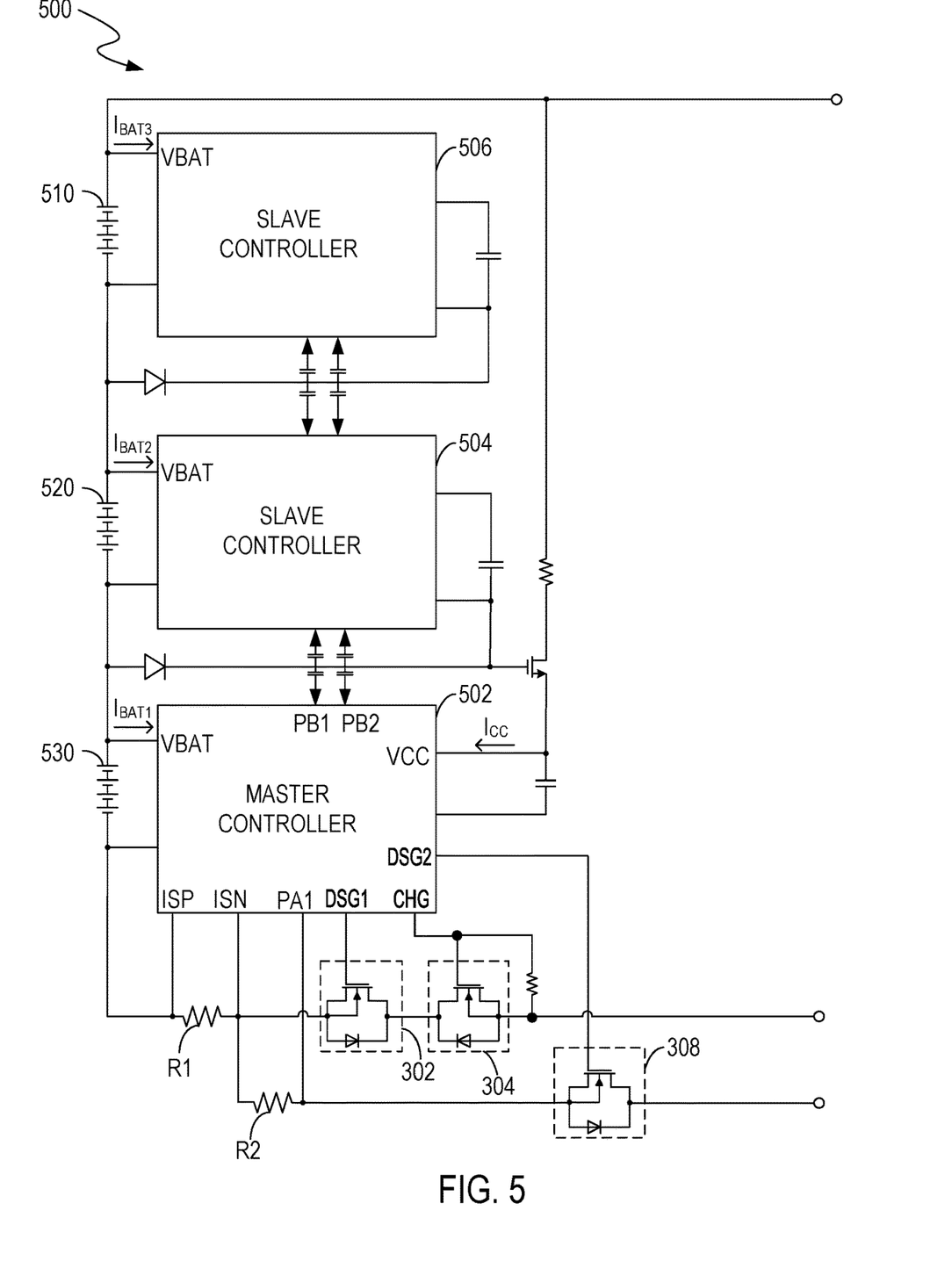
FIG. 5 shows a battery management system, in an embodiment of the present invention.

FIG. 5 shows a battery management system 500, in an embodiment of the present invention. The battery management systems 300 and 400 of FIGS. 3 and 4 can be implemented using the battery management system 500 (the battery management system 500 can be substituted for the battery management systems 300 and 400). In the example of FIG. 5, the resistors R1 and R2 are arranged in series mode, but the resistors can be instead arranged in parallel mode. The battery management system 500 includes a master controller 502 and two slave controllers 504 and 506. Each of the master controller 502, the slave controller 504, and the slave controller 506 monitors and manages a corresponding group of battery cells. For example, the master controller 502 monitors and manages a first group of battery cells 530, the slave controller 504 monitors and manages a second group of battery cells 520, and the slave controller 506 monitors and manages a third group of battery cells 510. The battery management system 500 includes two discharge loops that are controlled by the master controller 502. A first discharge loop includes the first discharge switch 302 that can be coupled to a first load (not shown in FIG. 5) as in FIGS. 3 and 4. A second discharge loop includes the second discharge switch 308 that can be coupled to a second load (not shown in FIG. 5) as in FIGS. 3 and 4. The first current sensing resistor R1 is coupled in series with the first discharge switch 302 and is operable for sensing the first discharge current in the first discharge loop. The second current sensing resistor R2 is coupled in series with the second discharge switch 308 and is operable for sensing the second discharge current in the second discharge loop.

In an embodiment, the pins of the master controller 502 include VBAT, ISP, ISN, PB1, PB2, PA1, DSG1, DSG2, CHG, and VCC. The voltage sensing pin VBAT senses the total voltage of the battery cell group 530. The current sensing pins ISP, ISN, and PA1 are utilized by the master controller 502 to sense the charge current and discharge current. More specifically, a first discharge current in the first discharge loop is sensed by monitoring a voltage difference across the first current sensing resistor R1, which is coupled in series with the first discharge switch 302. The current sensing resistor R1 has one end coupled to the ISP pin and the other end coupled to the ISN pin. A second discharge current in the second discharge loop is sensed by monitoring a voltage difference across the current sensing resistor R2, which is coupled in series with the second discharge switch 308. The current sensing resistor R2 has one end coupled to the ISN pin and the other end coupled to the PA1 pin. The first driving pin CHG is coupled to the charge switch 304 and is operable for turning on the charge switch. The second driving pin DSG1 is coupled to the first discharge switch 302 and is operable for turning on the first discharge switch 302. The third driving pin DSG2 is coupled to the second discharge switch 308 and is operable for turning on the second discharge switch 308. The master controller 502 receives a first current (cell group current) $I_{BAT1}$ from the battery cell group 530 and receives a second current (pack current) $I_{CC}$ from the whole battery pack. The total current consumed by the master controller 502 is the sum of the first current $I_{BAT1}$ and the second current $I_{CC}$. In other words, the battery cell group 530, which is monitored and managed by the master controller 502, provides a first current $I_{BAT1}$ to power the master controller 502. The battery cell groups 510, 520, and 530 together provide a second current $I_{CC}$ to power the master controller 502. The master controller 502 receives the first current $I_{BAT1}$ from the VBAT pin and receives the second current $I_{CC}$ from the VCC pin.

The slave controller 504 receives a current $I_{BAT2}$, which is generated by the battery cell group 520 and is received at the VBAT pin of the slave controller 504. The slave controller 506 receives a current $I_{BAT3}$, which is generated by the battery cell group 510 and is received at the VBAT pin of the slave controller 506. The master controller 502 is operable for communicating with the slave controller 504 and the slave controller 506 through a communication port. In an embodiment, the communication port of the master controller 502 includes two pins PB1 and PB2 for differential communication. The master controller 502 is operable for receiving a signal indicating an amount of the current $I_{BAT2}$ received by the slave controller 504 and for receiving a signal indicating an amount of the current $I_{BAT3}$ received by the slave controller 506. The master controller 502 is further operable for balancing the current $I_{BAT1}$, $I_{BAT2}$, and $I_{BAT3}$. More specifically, the master controller 502 is operable for adjusting the current $I_{BAT1}$ according to the currents $I_{BAT2}$ and $I_{BAT3}$, and/or for generating balancing commands to adjust $I_{BAT2}$ and $I_{BAT3}$. The master controller 502 is operable for generating balancing commands and for transmitting the balancing commands to the slave controller 504 and the slave controller 506 through the communication port. Upon receiving the balancing commands, the slave controller 504 and the slave controller 506 are operable for adjusting the currents $I_{BAT2}$ and $I_{BAT3}$, respectively. The goal is to make the currents $I_{BAT1}$, $I_{BAT2}$, and $I_{BAT3}$ equal to each other. Consequently, each group of the battery cell groups 510, 520, and 530 provides an equal current to a corresponding controller, thereby reducing or eliminating any unbalance between the battery cell groups 510, 520, and 530.

Figure 6:
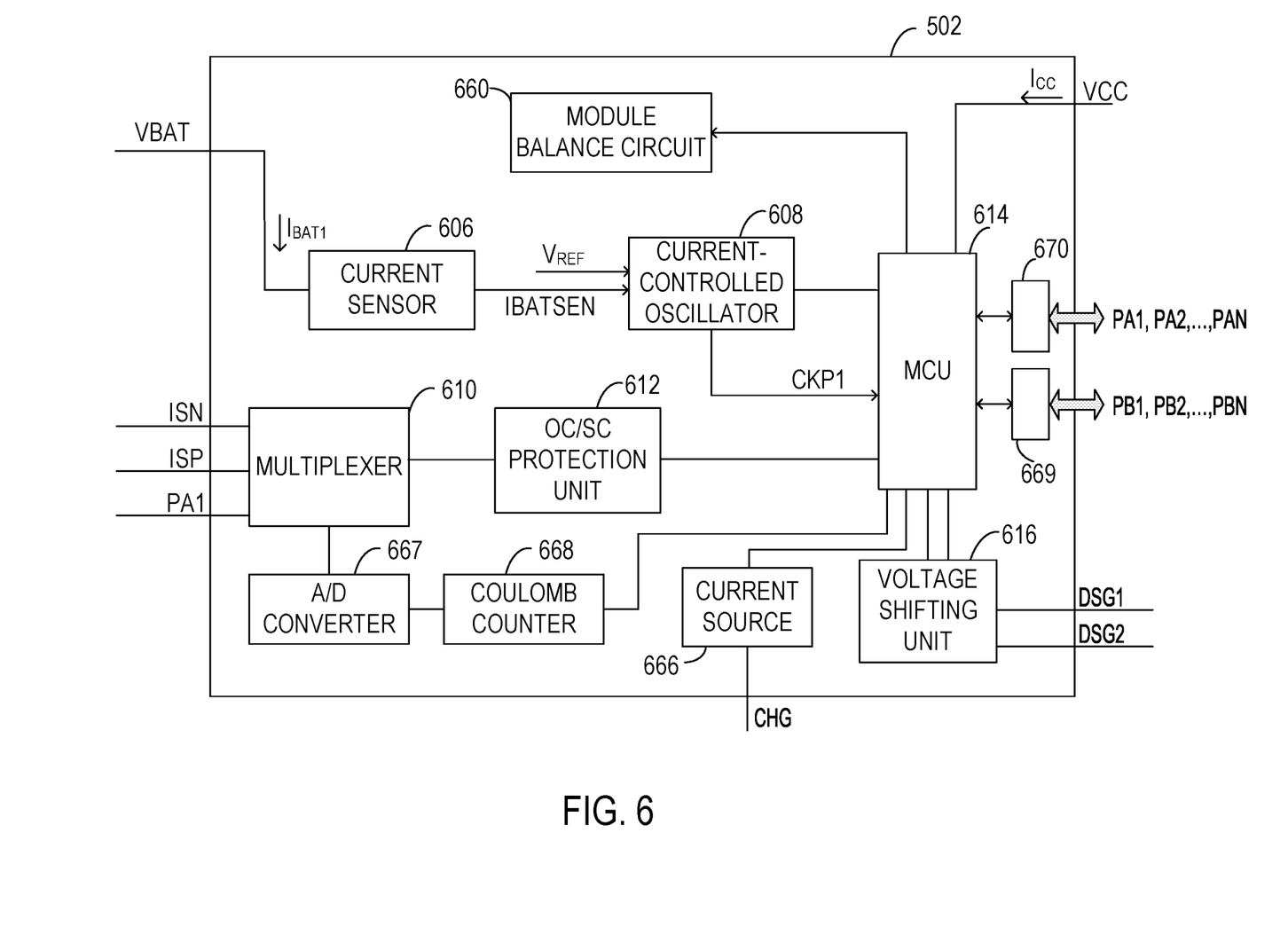
FIG. 6 shows a battery controller, in an embodiment of the present invention.

FIG. 6 shows a battery controller, e.g., the master controller 502 in FIG. 5, in an embodiment of the present invention. The master controller 502 includes a current sensor 606, a current-controlled oscillator 608, a module balance circuit 660, a multiplexer 610, an A/D converter 667, a coulomb counter 668, an over-current/short-current (OC/SC) protection unit 612, a voltage shifting unit 616 and an MCU 614. The VBAT pin of the master controller 502 senses a total voltage of the first group of battery cells 530 and receives a current IBAT1 that is generated by the first group of battery cells 530. The current IBAT1 flows into the master controller 502 and through the current sensor 606. The current sensor 606 senses an amount of the current IBAT1 and generates a sensing signal IBATSEN indicating the amount of the current IBAT1. The current-controlled oscillator 608 receives the sensing signal IBATSEN and generates a first signal CKP1 indicating the amount of the current IBAT1. In an embodiment, the first signal CKP1 is a clock signal, where the frequency of the first signal CKP1 is proportional to the current IBAT1. More specifically, the frequency F1 of the first signal CKP1 is given by $$F1 = K * IBATSEN, \quad (1)$$

where K is the gain of the current-controlled oscillator 608. Initially, K is not known. The master controller 502 is operable for calculating K utilizing a preset reference voltage $V_{REF}$. In an embodiment, a relatively accurate reference current $I_{REF}$ is generated based on the reference voltage $V_{REF}$ and a resistor (not shown in FIG. 6) with known resistance. The reference current $I_{REF}$ is applied to the current-controlled oscillator 608 to generate a clock signal $CKP_{REF}$. Because the reference current $I_{REF}$ is known, the gain K can be obtained by measuring the frequency of the clock signal $CKP_{REF}$. With the known K, the corresponding relationship between the measured current $I_{BAT1}$ and the frequency of the first signal CKP1 output from the current-controlled oscillator 608 is determined.

The multiplexer 610, which is coupled to the pins ISN, ISP, and PA1, receives the sensing signals from the current sensing resistors R1 and R2 (shown in FIG. 5). In the example of FIG. 5, the resistors R1 and R2 are arranged in series mode, and the multiplexer 610 is operable for selectively inputting sensing signals from ISP and ISN to sense a total discharge current flowing through the first discharge loop and the second discharge loop. If the battery management system 500 is configured to use an architecture similar to that shown in FIG. 3, where the resistors R1 and R2 are arranged in parallel mode, then the multiplexer 610 is operable for selectively inputting sensing signals from ISP and ISN to sense a first discharge current flowing through the first discharge loop or selectively inputting sensing signals from ISP and PA1 to sense a second discharge current flowing through the second discharge loop. The series mode configuration of the current sensing resistors in FIG. 4 and FIG. 5 has an advantage over the parallel mode configuration in FIG. 3 because the total discharge current can be monitored through one resistor R1, and therefore the battery controller can perform continuous coulomb counting without any charge loss.

The over-current/short-current protection unit 612 is coupled to the multiplexer 610 and is operable for detecting an over-current or a short-current situation.

The MCU 614 integrated in the master controller 502 includes multiple GPIO pins which can be configured for various purposes. The GPIO pins can include a first group of pins PA1, PA2, ..., PAN and a second group of pins PB1, PB2, ..., PBN. Each of the GPIO pins can be configured for a different purpose. In the example of FIG. 6, PA1 from the first group is used as a current sensing pin, and PB1 and PB2 from the second group are used as communication ports for data transmission between the master controller 502 and the slave controllers 504 and 506 (shown in FIG. 5). Here, the configuration of PA1, PB1, and PB2 is an example but not a limitation. In practice, any GPIO pin, e.g., any of the GPIO pins from the first group of pins and the second group of pins, can be used for current sensing or data transmission. The master controller 502 includes a transceiving unit 669, e.g., a physical layer interface, for enabling the MCU 614 to communicate with another module of the battery management system (e.g., the slave controllers 504 and 506 in FIG. 5) via the communication port. The master controller 502 further includes a GPIO control unit 670 used by the MCU 614 to control the first group of pins PA1, PA2, . . . , PAN. Two other GPIO pins of the MCU 614 are used as driving pins for providing driving signals to the first discharge switch 302 and the second discharge switch 308. The voltage shifting unit 616 is coupled to the MCU 614 for shifting voltages of driving signals to appropriate levels before they are output from the DSG1 and DSG2 pins of the master controller 502. Inside the master controller 502, the first driving pin CHG is coupled to a current source 666 that is controlled by the MCU 614.

The module balance circuit 660 is operable for adjusting the current consumed by the master controller 502 to adjust the amount of the current $I_{BAT1}$ flowing into the master controller 502. The module balance circuit 660 includes a variable resistor, in an embodiment. The module balance circuit 660 can increase the resistance of the variable resistor to increase the current $I_{BAT1}$ and vice versa. The master controller 502 further includes a cell balance circuit (not shown) for monitoring and balancing each cell of the battery cell group 530.

The A/D converter 667 and the coulomb counter 668 are coupled to the current sensing pins ISN, ISP, and PA1 through the multiplexer 610 for calculating changes in the amount of capacity of the battery pack.

A slave controller according to the present invention, e.g., the slave controller 504 in FIG. 5, includes less components than the master controller 502. For example, the slave controller 504 does not include an MCU. Thus, the slave controller 504 consumes less power than the master controller 502. The master controller 502 can be divided into two power domains. One power domain includes components similar to the components in a slave controller, and is powered by the current $I_{BAT1}$ from the first group of battery cells 530. The other power domain includes components that a slave controller does not include, e.g., an MCU, and is powered by the current $I_{CC}$ from the whole battery pack. The master controller 502 is operable for utilizing the module balance circuit 660 to adjust the current $I_{BAT1}$. The master controller 502 is also operable for generating balancing commands to adjust the current $I_{BAT2}$ and the current $I_{BAT3}$, which are consumed by the slave controller 504 and 506, respectively.

In operation, the MCU 614 of the master controller 502 is operable for generating a measurement command and for transmitting the measurement command via the communication port (e.g., the PB1 and PB2 pins) to the slave controllers 504 and 506. The measurement command includes time information that can be received by the slave controllers 504 and 506. Upon receiving the measurement command, the slave controllers 504 and 506 perform current measurements with the master controller 502 together, e.g., within a same time period, to measure the currents $I_{BAT1}$, $I_{BAT2}$, and $I_{BAT3}$. In an embodiment, each of the slave controllers 504 and 506 includes a module balance circuit, a current sensor, and a current-controlled oscillator that perform similar functions as the corresponding units in the master controller 502.

Take the slave controller 504 as an example. The current $I_{BAT2}$ sensed by the current sensor in the slave controller 504 is transmitted to the current-controlled oscillator in the slave controller 504 and a corresponding signal CKP2 that indicates the amount of the current $I_{BAT2}$ is generated. In an embodiment, CKP2 is a clock signal and has a frequency proportional to the current $I_{BAT2}$. CKP2 is transmitted to the master controller 502 via the communication port. Based on the frequency of CKP2, the master controller 502 compares the amount of the current $I_{BAT2}$ with the amount of the current $I_{BAT1}$. In an embodiment, if the current $I_{BAT1}$ is less than the current $I_{BAT2}$, then the master controller 502 controls the module balance circuit 660 to increase the current $I_{BAT1}$, e.g., by increasing the resistance of a variable resistor to consume more power. In another embodiment, if the current $I_{BAT1}$ is less than the current $I_{BAT2}$, then the master controller 502 generates a balancing command and transmits the balancing command to the slave controller 504. According to the balancing command, the slave controller 504 utilizes its module balance circuit to reduce the current $I_{BAT2}$, e.g., by decreasing the resistance of a variable resistor. As a result, the current $I_{BAT1}$ and the current $I_{BAT2}$ can be adjusted to be equal to each other. Similarly, the current $I_{BAT3}$ consumed by the slave controller 506 can be adjusted to be equal to the current $I_{BAT1}$ and the current $I_{BAT2}$. Finally, each of the battery cell groups 510, 520, and 530 provides equal current for a corresponding controller to consume, and therefore an unbalanced state among the battery cell groups 510, 520, and 530 can be reduced or eliminated.

Figure 7:
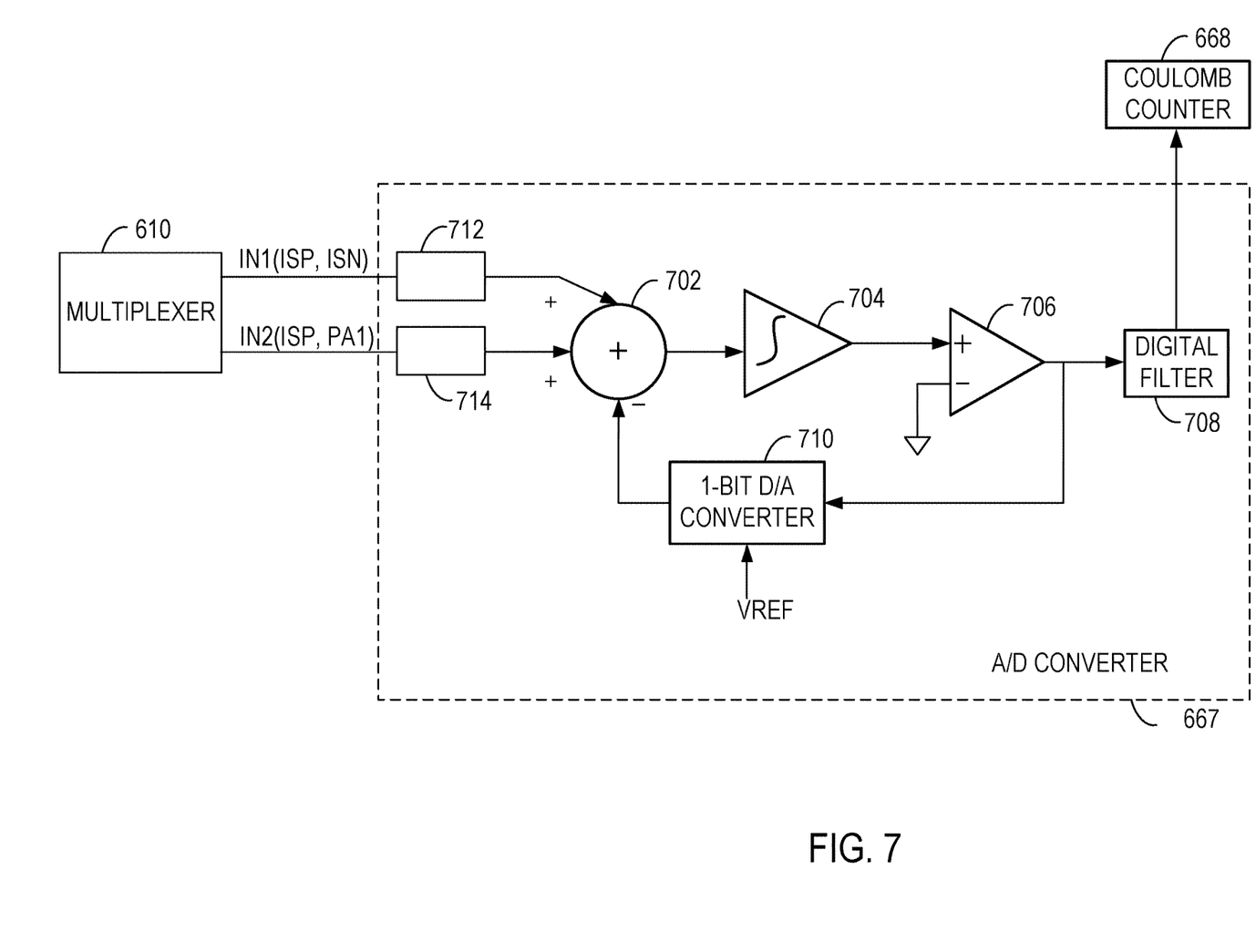
FIG. 7 shows an analog-to-digital (A/D) converter in a battery controller, in an embodiment of the present invention.

FIG. 7 shows an A/D converter in a battery controller, e.g., the A/D converter 667 in FIG. 6, in accordance with an embodiment of the present invention. The A/D converter 667 can be a first order sigma-delta A/D converter that includes an adding unit 702, an integrator 704, a comparator 706, a 1-bit digital-to-analog (D/A) converter 710, and a digital filter 708.

If the battery management system is configured to use the architecture shown in FIG. 4 and FIG. 5, where the resistors R1 and R2 are arranged in series mode, then the adding unit 702 receives a differential signal IN1(ISP,ISN), which indicates a voltage difference across the resistor R1 and also indicates a total discharge current of the first discharge loop and the second discharge loop. The differential signal IN1 (ISP,ISN) is applied to a first weighting factor 712 before it is fed to the adding unit 702.

If the battery management system is configured to use the architecture shown in FIG. 3, where the resistors R1 and R2 are arranged in parallel mode, then the adding unit 702 receives a first differential signal IN1(ISP,ISN) and a second differential signal IN2(ISP,PA1) and adds them together. The first differential signal IN1(ISP,ISN) indicates a voltage difference across the resistor R1 and also indicates a discharge current of the first discharge loop. The second differential signal IN2(ISP,PA1) indicates a voltage difference across the resistor R2 and also indicates a discharge current of the second discharge loop. The differential signal IN1(ISP,ISN) is applied to a first weighting factor 712 before it is fed to the adding unit 702. The differential signal IN2(ISP,PA1) is applied to a second weighting factor 714 before it is fed to the adding unit 702.

The 1-bit D/A converter 710 is coupled to the output terminal of the comparator 706 and provides negative feedback to the adding unit 702.

The integrator 704 integrates the output from the adding unit 702. The output of the integrator 704 is applied to a positive terminal of the comparator 706. The output of the comparator 706 is filtered by a digital filter 708 and then sent to the coulomb counter 668 for calculating the change in the amount of capacity of the battery pack.

Figure 8:
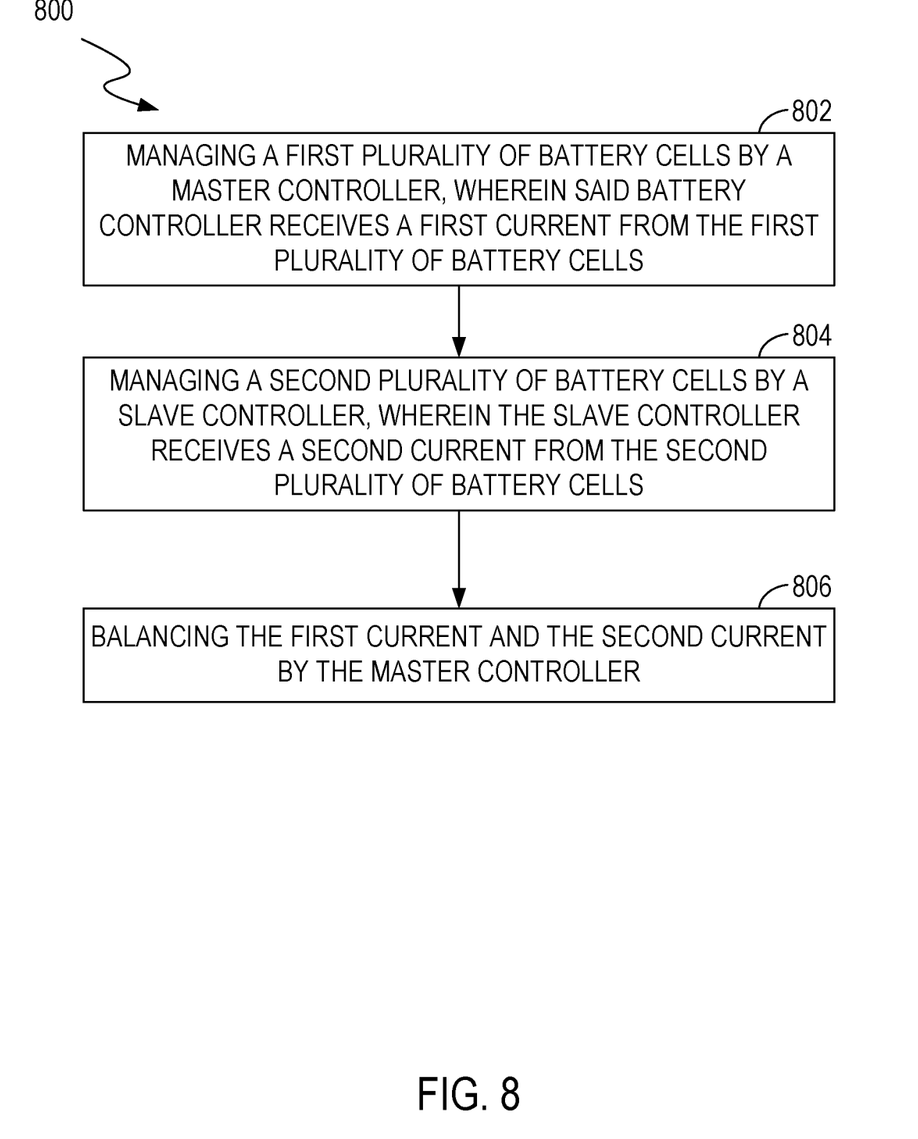
FIG. 8 shows a flowchart illustrating a method for managing a battery pack, in an embodiment of the present invention.

FIG. 8 shows a flowchart 800 illustrating a method for managing a battery pack, in accordance with an embodiment of the present invention. FIG. 8 is described in combination with FIG. 5 and FIG. 6.

In block 802, a master controller 502 manages a first group of battery cells 530 and receives a first current from the battery cell group 530.

In block 804, a slave controller 504 manages a second group of battery cells 520 and receives a second current from the battery cell group 520.

In block 806, the master controller 502 balances the first current and the second current, such that the first current is equal to the second current. In an embodiment, the slave controller 504 generates a signal CKP2 indicating an amount of the second current and transmits the signal CKP2 to the master controller 502. The master controller 502 adjusts the first current in response to receiving the signal CKP2 and/or transmits a balancing command to the slave controller 504 to adjust the second current.

Advantageously, embodiments according to the present invention provide a battery management system that includes one master controller and one or more slave controllers. The master controller can balance the current consumed by each of the master controller and the slave controllers such that an unbalanced state among different groups of battery cells can be reduced or eliminated. Furthermore, the battery management system can include two discharge loops. Utilizing dedicated discharge switches and corresponding driving pins, each discharge loop can be independently controlled by the master controller.

While the foregoing description and drawings represent embodiments according to the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery controller, comprising:
a first driving pin, coupled to a charge switch, operable for turning on said charge switch to enable a battery pack to be charged by a power source;
a second driving pin, coupled to a first discharge switch, operable for turning on said first discharge switch to enable said battery pack to power a first load;
a third driving pin, coupled to a second discharge switch, operable for turning on said second discharge switch to enable said battery pack to power a second load; and
a communication port, coupled to a slave controller, operable for receiving a first signal indicating an amount of a first current consumed by said slave controller and operable for transmitting a balancing command to said slave controller to adjust said first current.

2. The battery controller of claim 1, further comprising:
a micro controlling unit (MCU) comprising multiple general purpose input/output (GPIO) pins operable for providing driving signals to control said first discharge switch and said second discharge switch; and
a voltage shifting unit coupled to said MCU,
wherein said voltage shifting unit is operable for shifting voltages of said driving signals.

3. The battery controller of claim 1, wherein said communication port comprises two pins for differential communication.

4. The battery controller of claim of claim 1, wherein said first signal is a clock signal, and wherein a frequency of said first signal is proportional to said first current.

5. The battery controller of claim 1, further comprising:
a current sensor, operable for sensing a second current that is generated by a first plurality of battery cells and consumed by said battery controller; and
a current-controlled oscillator, coupled to said current sensor, operable for generating a second signal indicating an amount of said second current, wherein said second signal is a clock signal and a frequency of said second signal is proportional to said second current,
wherein said first plurality of battery cells is monitored and managed by said battery controller, and
wherein said first current is generated by a second plurality of battery cells that are monitored and managed by said slave controller.

6. The battery controller of claim 5, further comprising:
a module balance circuit operable for adjusting said second current.

7. The battery controller of claim 6, wherein said module balance circuit includes a variable resistor, wherein said battery controller increases a resistance of said variable resistor to increase said second current if said second current is less than said first current.

8. The battery controller of claim 5, wherein said battery controller generates said balancing command and transmits said balancing command to said slave controller to increase said first current if said first current is less than said second current.

9. A battery management system for managing a battery pack comprising a first plurality of battery cells and a second plurality of battery cells, said battery management system comprising:
a master controller operable for monitoring and managing said first plurality of battery cells, wherein said master controller consumes a first current from said first plurality of battery cells; and
a slave controller operable for monitoring and managing said second plurality of battery cells, wherein said slave controller consumes a second current from said second plurality of battery cells,
wherein said slave controller is operable for generating a signal indicating an amount of said second current consumed by said slave controller and transmitting said signal to said master controller, and
wherein said master controller is operable for adjusting said first current consumed by said master controller and controlling said slave controller to adjust said second current consumed by said slave controller.

10. The battery management system of claim 9, further comprising:
a first discharge loop comprising a first discharge switch that is configured to be coupled to a first load; and
a second discharge loop comprising a second discharge switch that is configured to be coupled to a second load,
wherein said master controller is operable for outputting driving signals to control said first discharge switch and said second discharge switch.

11. The battery management system of claim 10, further comprising:
a resistor coupled to said first discharge loop and said second discharge loop for sensing a first discharge current in said first discharge loop and a second discharge current in said second discharge loop, wherein both said first discharge current and said second discharge current flow through said resistor.

12. The battery management system of claim 9, wherein said slave controller comprises:
a current sensor, operable for sensing said second current; and
a current-controlled oscillator, coupled to said current sensor, operable for generating said signal based on said second current, wherein a frequency of said signal is proportional to said second current.

13. The battery management system of claim 9, wherein said master controller is operable for transmitting a balancing command to said slave controller to adjust said second current.

14. The battery management system of claim 13, wherein said slave controller comprises:
a module balance circuit operable for adjusting said second current according to said balancing command from said master controller.

15. The battery management system of claim 14, wherein said module balance circuit includes a variable resistor, wherein said slave controller increases a resistance of said variable resistor to increase said second current if said second current is less than said first current.

16. A method for managing a battery pack, comprising:
managing a first plurality of battery cells by a master controller, wherein said master controller consumes a first current from said first plurality of battery cells;
managing a second plurality of battery cells by a slave controller, wherein said slave controller consumes a second current from said second plurality of battery cells; and
balancing said first current consumed by said master controller and said second current consumed by said slave controller by said master controller.

17. The method of claim 16, further comprising:
generating a signal indicating an amount of said second current by said slave controller;
transmitting said signal from said slave controller to said master controller; and
transmitting a balancing command from said master controller to said slave controller to adjust said second current.

18. The method of claim 17, wherein said signal is a clock signal and wherein a frequency of said signal is proportional to said second current.

19. The method of claim 17, further comprising:
adjusting a variable resistor in said slave controller to adjust said second current.

20. The method of claim 17, further comprising:
increasing said second current if said second current is less than said first current.

* * * * *